United States Patent
Jang (10) Patent No.: US 10,072,449 B2
(45) Date of Patent: Sep. 11, 2018

(54) ROLLER

(71) Applicant: Hyuk Soo Jang, Seongnam-si (KR)

(72) Inventor: Hyuk Soo Jang, Seongnam-si (KR)

(73) Assignee: Hyuk Soo Jang, Seongnam-si (KR)

( * ) Notice: Subject to any disclaimer, the term of this patent is extended or adjusted under 35 U.S.C. 154(b) by 0 days.

(21) Appl. No.: 15/309,418

(22) PCT Filed: May 7, 2015

(86) PCT No.: PCT/KR2015/004536
§ 371 (c)(1),
(2) Date: Nov. 7, 2016

(87) PCT Pub. No.: WO2015/170884
PCT Pub. Date: Nov. 12, 2015

(65) Prior Publication Data
US 2017/0138105 A1    May 18, 2017

(30) Foreign Application Priority Data
May 8, 2014   (KR) ........................ 10-2014-0055153

(51) Int. Cl.
*F16C 13/02* (2006.01)
*F16C 19/32* (2006.01)
(Continued)

(52) U.S. Cl.
CPC ............. *E05D 13/00* (2013.01); *E05D 15/06* (2013.01); *E05D 15/0604* (2013.01);
(Continued)

(58) Field of Classification Search
CPC .......... F16C 13/00; F16C 13/02; F16C 19/32; F16C 19/34; F16C 19/381; F16C 19/545; F16C 33/583; F16C 2350/00
(Continued)

(56) References Cited

U.S. PATENT DOCUMENTS 2,030,104 A * 2/1936 Eksergian ............... B21B 27/02
384/455
2,078,044 A * 4/1937 Vigne ................... F16C 19/545
384/454
(Continued)

FOREIGN PATENT DOCUMENTS

DE        4115217 A1 * 11/1992 ............ F16C 19/545
DE       19625930 A1 *  1/1998 ............ F16C 19/545
(Continued)

OTHER PUBLICATIONS

International Search Report—PCT/KR2015/004536 dated Sep. 4, 2015.

*Primary Examiner* — Marcus Charles
(74) *Attorney, Agent, or Firm* — Cantor Colburn LLP (57) ABSTRACT

Provided is a roller, and more particularly, to a rotary shaft of the upper part of a rolling wheel, having an inclined surface formed along the circumference of an outer diametral surface thereof, is inserted into at least one coupling groove formed on a transfer bracket, a thrust member is provided at the upper part of the rotary shaft so as to allow a thrust load to be concentrated on the upper end of the rotary shaft or the thrust member, and a radial member is provided at the inner surface of the coupling groove and the rotary shaft positioned at the lower part of the thrust member, thereby supporting a radial load.

24 Claims, 9 Drawing Sheets

(51) Int. Cl.
  *F16C 19/54* (2006.01)
  *F16C 33/58* (2006.01)
  *E05D 13/00* (2006.01)
  *F16C 19/34* (2006.01)
  *F16C 19/38* (2006.01)
  *E05D 15/06* (2006.01)
  *F16C 13/00* (2006.01)

(52) U.S. Cl.
  CPC ..... *E05D 15/0608* (2013.01); *E05D 15/0665* (2013.01); *F16C 13/00* (2013.01); *F16C 13/02* (2013.01); *F16C 19/32* (2013.01); *F16C 19/34* (2013.01); *F16C 19/381* (2013.01); *F16C 19/545* (2013.01); *E05Y 2201/63* (2013.01); *F16C 2350/00* (2013.01)

(58) Field of Classification Search
  USPC ......... 384/58, 454–455, 537, 548, 564, 571, 384/618–619, 453, 590
  See application file for complete search history.

(56) References Cited

U.S. PATENT DOCUMENTS

| | | | | |
|---|---|---|---|---|
| 2,886,382 A * | 5/1959 | Baublys | ............... | F16B 21/18 384/537 |
| 3,795,456 A * | 3/1974 | Schafer | ............... | B29C 47/0801 366/79 |
| 3,811,626 A * | 5/1974 | Kemnitz | ............... | B02C 2/04 241/214 |
| 3,934,956 A * | 1/1976 | Pitner | ............... | F16C 19/30 384/455 |
| 4,124,256 A * | 11/1978 | de Senneville | ....... | F16C 19/381 384/455 |
| 4,512,525 A * | 4/1985 | Cameron | ............... | F16C 19/545 241/207 |
| 4,730,995 A * | 3/1988 | Dewhirst | ............... | F01C 21/02 384/517 |
| 5,261,750 A * | 11/1993 | Eckhardt | ............... | F16C 19/545 384/455 |
| 7,950,855 B2 * | 5/2011 | Wolf | ............... | F16C 19/49 384/454 |
| 8,523,453 B2 * | 9/2013 | Loeschner | ............... | F16C 19/49 384/455 |
| 2003/0113047 A1 * | 6/2003 | Baumann | ............... | F41A 27/08 384/455 |

FOREIGN PATENT DOCUMENTS

| | | | | |
|---|---|---|---|---|
| DE | 102013106680 B3 * | 8/2014 | ............ | F16J 15/002 |
| FR | 2349763 A1 * | 11/1977 | ............ | F16C 19/545 |
| GB | 777620 A * | 6/1957 | ............ | F16C 19/10 |
| JP | 11159233 | 6/1999 | | |
| JP | 11172995 | 6/1999 | | |
| JP | 2000045618 | 2/2000 | | |
| KR | 101246409 | 3/2013 | | |
| KR | 101324080 | 10/2013 | | |
| WO | WO-03040560 A1 * | 5/2003 | ......... | F04B 27/1063 |

\* cited by examiner

FIG. 1A

*Prior Art*

FIG. 1B

*Prior Art*

FIG. 1C

*Prior Art*

ROLLER

CROSS REFERENCE TO RELATED APPLICATIONS

This application is a national entry of PCT Application No. PCT/KR2015/004536 filed on May 7, 2015, which claims priority to and the benefit of Korean Application No. 10-2014-0055153 filed on May 8, 2014, in the Korean Patent Office, the entire contents of which are incorporated herein by reference.

TECHNICAL FIELD

The present disclosure relates to a roller, and particularly, to a roller which is enabled to resolve the problem of reduced durability of a thrust member and a radial member due to a biased vertical load and lateral thrusting, which act on a rotational shaft or a rolling wheel, by improving a structure so as to efficiently absorb, disperse, and share a thrust load and a radial load and minimize lateral thrusting of a rolling wheel and foreign materials, moisture and the like by configuring the thrust member and a radial member as a sealed structure.

BACKGROUND ART

The present applicant possess a patent right for a wheel for sliding windows and doors patent-registered on Mar. 15, 2013 by applying a patent for "Wheel of Sliding Windows and Doors Having Preventing Eccentric Structure of Horizontal Rotation Wheel (Application No. 10-2011-0120393") on Nov. 17, 2011.

The patent relates to a wheel for sliding windows and doors in which two or more inclined surface rolling wheels 10 having lateral contact surfaces are coupled to one transfer bracket 20 and contact a pair of diagonal surface guides 32 configured on a guide rail 30, respectively to support an upper load by respective generated reaction force and the respective inclined surface rolling wheels 10 move while rotate in opposite directions during moving and characteristic contents of the technology will be described below.

Figure 1A:
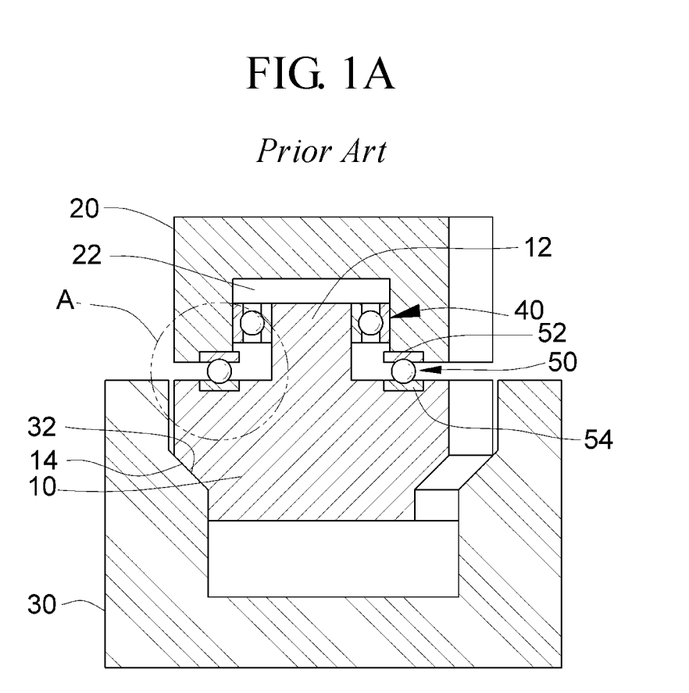
FIG. 1A is a diagram illustrating a structure of a roller in the related art.
Figure 1B:
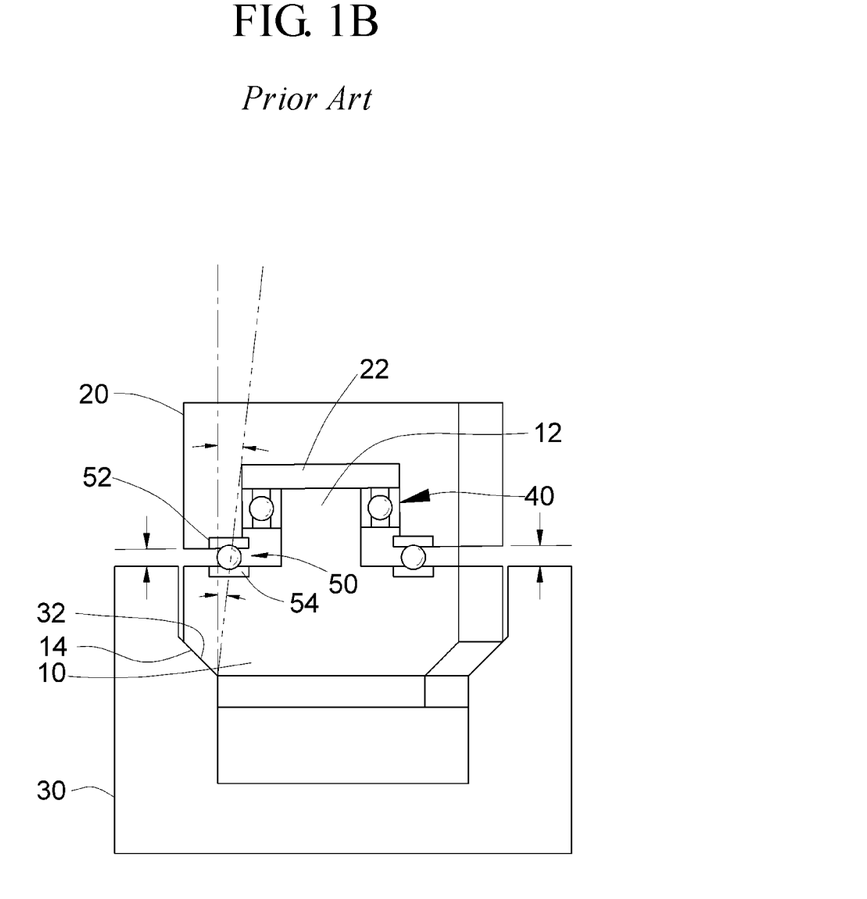
FIG. 1B is a diagram of omitting a cross-sectional display of FIG. 1A in order to illustrate an action state of the roller in the related art.
Figure 1C:
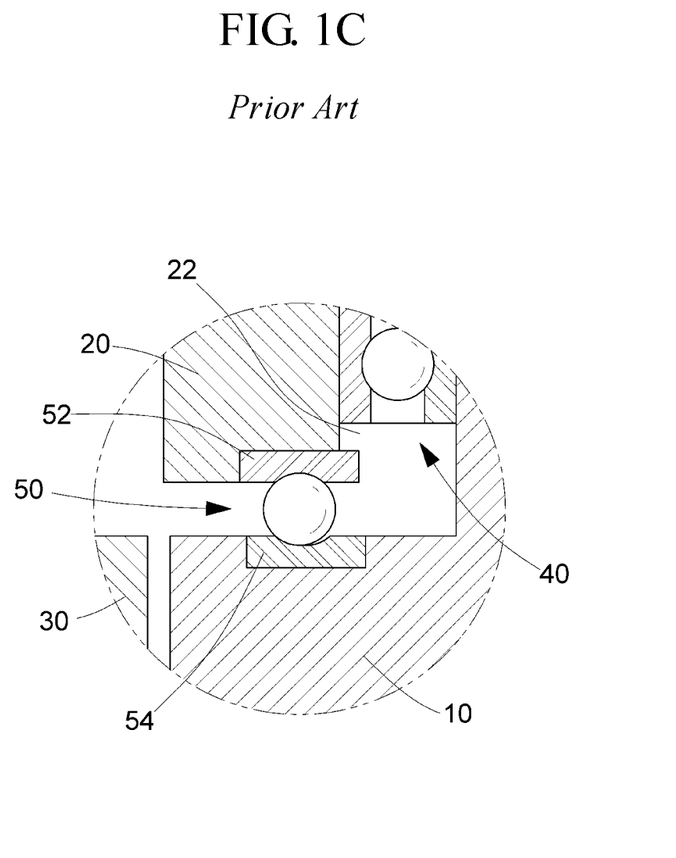
FIG. 1C is an enlarged diagram of part A of FIG. 1A illustrating a state of a thrust member when an inclined surface rolling wheel of the roller in the related art is laterally thrust.

As illustrated in FIGS. 1A, 1B and 1C, provided is a structure in which a transfer bracket 20 is formed one or more coupling grooves 22 are formed in a vertical direction, an inclined surface rolling wheel 10 is molded while being integrated with a rotational shaft 12 in an orthogonal direction, a radial bearing 40 axially installed on the rotational shaft 12, and a thrust bearing 50 in which a lower race 54 is coupled to the top of the inclined surface rolling wheel 10 are constituted and coupled.

There is a technical characteristic that the top of the inclined surface rolling wheel 10 having an integrated structure with the rotational shaft 12 in the orthogonal direction maintains the orthogonal direction by the radial bearing 40 and the transfer bracket 20 to prevent the rotational shaft 12 from being tilted from a contact portion of the inclined surface rolling wheel 10 and the guide rail 30 in an opposite direction and an anteroposterior direction and prevent the lower race 54 in a thrust bearing 50 from drooping as the rotational shaft 12 is tilted, and as a result, upper and lower races 52 and 54 maintain a predetermined gap and drivability and rollability are secured by dispersing force to a ball or a roller.

However, the technology has a technical limit due to reasons described below.

First, there is a limit in durability depending on oxidation of an oil film and intrusion of foreign materials.

In general, the thrust bearing 50 supporting a vertical load is constituted by the upper race 52 and the lower race 54 and the ball or roller is installed therebetween and the oil film is formed on the surface to maintain a minute gap between the upper race 52 and the lower race 54 and as a result, the thrust bearing 50 is smoothly driven.

However, when the oil film is broken, the ball and the roller directly contact the upper race 52 and the lower race 54, and as a result, friction force cannot but increase and the friction force degrades the rollability and the durability of the bearing.

The oil film is broken due to reasons including oxidation of a lubricant depending on inflow of dust, foreign materials, and air, generation of rust depending on inflow of moisture, and the like because the ball or roller is not normally sealed.

However, in the case of a coupling structure of the thrust bearing 50 and the inclined surface rolling wheel 10 in the related art, as a structure in which the upper race 52 of the thrust bearing 50 is fixed to a lower part of the transfer bracket 20 and the lower race 54 is fixed to an upper part of the inclined surface rolling wheel 10 to rotate in opposite directions, since outer diameters of the upper race 52 and the lower race 54 are just exposed to the outside as illustrated in FIGS. 1A, 1B, and 1C, it is actually impossible that the thrust bearing 50 and the inclined surface rolling wheel 10 are completely sealed.

Accordingly, the foreign materials which repeatedly flows in need to be cleaned and the lubricant needs to be supplied in order to maintain an appropriate oil film since an action for the maintenance is not easy in terms of a general consumer or user, it is very difficult to overcome the limit in durability.

Second, there is a problem in that driving deteriorates due to generation of bearing eccentricity depending on a limit in load dispersion.

In the case of a load dispersion structure of the roller in the related art, the inclined surface rolling wheel 10 has a contact structure configured by an inclined surface on a line of the guide rail 30, and as a result, force to be tilted in an opposite direction to the contact is generated and the inclined surface rolling wheel 10 is thrust to a lateral surface while sliding on the inclined surface as illustrated in FIG. 1C.

In the tilting and the lateral thrusting, the rotational shaft 12 is erected while maintaining the orthogonal direction by the radial bearing 40 fixed to the transfer bracket 20.

According to the erection structure, the inclined surface rolling wheel 10 maintains a horizontal direction with the transfer bracket 20 and a predetermined gap is maintained between the lower race 54 of the thrusting bearing 50 fixed to the top of the inclined rolling wheel 10 and the upper race 52 of the thrusting bearing 50 fixed ton the bottom of the transfer bracket 20 to secure rotation smoothness of the thrust bearing 50.

However, in such a structure, when a predetermined load or more is applied, a concentration load generated at the contact of the guide rail 30 acts as force which concentrates on the radial bearing 40 and the thrust bearing 50, and as a result, the rotational shaft 12 is eccentric.

A bearing layout structure of the related art is a structure in which the lower race 54 of the thrust bearing 50 is fixed in a circumferential direction around the rotational shaft 12 at the upper part of the inclined surface rolling wheel 10 and multiple balls or rollers are uniformly distributed in the circumferential direction around the rotational shaft 12.

Based on the contact of the inclined surface rolling wheel 10, provided is a structure (multiple balls or rollers are substantially distributed in the circumferential direction) in which the ball or roller is disposed at a left side and a right side around the rotational shaft 12 as illustrated in FIG. 1B.

Accordingly, a predetermined vertical load or more is applied, larger reaction force generated at the contact of the inclined surface rolling wheel 10 and the guide rail 30 is directly applied to the lower race 54 separated from the rotational shaft 12 or a lateral part of the ball to guide eccentricity of the inclined surface rolling wheel 10 or the rotational shaft 12. Such an eccentricity phenomenon is more significantly exhibited by the tilting phenomenon of the rotational shaft 12 and the lateral thrusting of the inclined surface rolling wheel 10.

The radial bearing 40 is completed by inserting the ball or roller between an inner ring and an outer ring and an assembly tolerance of a predetermined gap therebetween occurs during an assembly process.

Further, the radial bearing 40 is inserted and fixed into the coupling groove 22 of the transfer bracket 20 and in this case, a coupling tolerance also occurs. The coupling tolerance occurs even in the course in which the rotational shaft 12 is axially installed on the inner ring of the radial bearing 40. Occurrence of the coupling tolerance, that is, the assembly tolerance and the assembly tolerance of the rotational shaft 12, and a clearance of the radial bearing 40 causes a minute tilting phenomenon of the rotational shaft 12 and the lateral thrusting of the inclined surface rolling wheel 10.

Further, in the related art, a layout position of the radial bearing 40 preventing horizontal tilting is also separated from the contact of the inclined surface rolling wheel 10 which is a tilting occurrence point due to the layout position of the thrust bearing 50, the radial bearing 40 is installed at a position not to relatively effectively prevent the tilting.

The minute tilting of the rotational shaft 12 consequently damages a uniform gap between the upper race 52 and the lower race 54 required for normal rotation of the thrust bearing 50 to concentratively apply the load on the ball or roller at a specific position, thereby significantly deteriorating the drivability or rollability of the inclined surface rolling wheel 10.

In addition, in the structure of the roller in the related art, there is a problem related with a limit in maintaining the durability of the bearing depending on sealing vulnerability and there is a problem in that the load is usable only within a limited range so as to prevent a driving trouble from being occurred due to eccentricity by biasing.

DISCLOSURE

Technical Problem

The present disclosure is contrived to solve the problem and an object of the present disclosure is to resolve the problem of reduced durability of a thrust member and a radial member due to a biased vertical load and lateral thrusting, which act on a rotational shaft or a rolling wheel, by improving a thrust member rotating while supporting a thrust load and a radial member rotating while supporting a radial load so as to efficiently absorb, disperse, and share a thrust load and a radial load and resolve the problem of reduced durability of the thrust member and the radial member due to foreign materials, moisture and the like by configuring the thrust member and the radial member as a sealed structure.

Technical Solution

The object is achieved by a roller in which a rotational shaft at an upper part of a rolling wheel 110 having a slanted surface 114 formed on a circumference of an outer diametral surface is inserted into one or more coupling grooves 122 formed in a transfer bracket 120 and a thrust member 150 is installed at the upper part of the rotational shaft 112 to allow a thrust load to concentrate on the top of the rotational shaft 112 or the thrust member 150 and a radial member 140 is installed on inner surfaces of the rotational shaft 112 and a coupling groove 122 positioned at the lower part of the thrust member 150 to support a radial load.

In addition, an upper race 152 of the thrust member 150 is closely attached or coupled and fixed onto the bottom of the coupling groove 122 and a rotation hole 154a of a lower race 154 of the thrust member 150 is inserted into a vertical step portion 116b formed on the top of the rotational shaft 112 to slip while maintaining a contact or inserted and thereafter, coupled and fixed and the lower race 154 of the thrust member 150 is seated on a horizontal step portion 116a.

Further, the upper race 152 of the thrust member 150 is closely attached or coupled and fixed onto the bottom of the coupling groove 122 and the top of the rotational shaft 112 is rounded to form a round portion 112a and an inner diametral surface of a rotation hole 154a of the lower race 154 of the thrust member 150 is rounded to slip while maintaining the contact by engaging with the round portion 112a.

Moreover, the upper race 152 of the thrust member 150 is closely attached or coupled and fixed onto the bottom of the coupling groove 122 and the rotation hole 154a of the lower race 154 of the thrust member 150 is inserted into a taper portion 118 on the top of the rotational shaft 112 which is tapered up toward a center point to slip while maintaining the contact or inserted and thereafter, coupled and fixed.

Besides, the upper race 152 of the thrust member 150 is closely attached or coupled and fixed onto the bottom of the coupling groove 122 and after a first fixation groove 156 is formed at the center of the bottom of the lower race 154 of the thrust member 150 formed as a disk, the top of the rotational shaft 112 is inserted and coupled into the first fixation groove 156, and as a result, while the top of the rotational shaft 112 is inserted into the first fixation groove 156 to maintain the contact, the top of the rotational shaft 112 slips or inserted and thereafter, coupled and fixed.

Herein, the top of the rotational shaft 112 is tapered or rounded up toward the center point and the first fixation groove 156 has a groove shape corresponding to the shape of the rotational shaft 112.

In addition, the upper race 152 of the thrust member 150 is closely attached or coupled and fixed onto the bottom of the coupling groove 122, a fixation shaft 158 is formed downward at the center of the bottom of the lower race 154 of the thrust member 150 formed as the disk, and a second fixation groove 119 is formed on the top of the rotational shaft 112, and as a result, while a second fixation groove 119 is formed on the top of the rotational shaft 112 and the fixation shaft 158 is inserted into the second fixation groove 119 to maintain the contact, the fixation shaft 158 slips or is inserted and thereafter, coupled and fixed.

Herein, the fixation shaft 158 is tapered or rounded down or the second fixation groove 119 has the groove shape corresponding to the shape of the fixation shaft 158.

In addition, the radial member 140 installed in the coupling groove 122 is configured by combining at least one single or multiple types of an opening type, a single-surface shield type, a both-surface shield type, a single-surface sealing type, and a both-surface sealing type.

Further, the thrust member 150 installed in the coupling groove 122 is configured by combining at least one single or multiple bearings of a thrust bearing, an angular bearing, an automatic centering bearing, a taper bearing, and an oilless bearing.

In addition, the radial member 140 installed in the coupling groove 122 is configured by combining at least one single or multiple bearings of a radial bearing, the automatic centering bearing, the taper bearing, the oilless bearing, at least one pin caster or pin ball, and a needle bearing.

Further, the roller preferably further includes a shield panel 160 having a shield hole 162 penetrated by the rotational shaft 112 in order to prevent foreign materials or polluted materials from flowing in the coupling groove 122 and coupled to a lower part of the coupling groove 122.

Meanwhile, the object is achieved by a roller in a rotational shaft at an upper part of a rolling wheel 110 having a slanted surface 114 formed on a circumference of an outer diametral surface is inserted into one or more coupling holes 124 formed to penetrate vertically in a transfer bracket 120 and a thrust member 150 is installed between the bottom of a cover part 126 coupled to an upper part of the coupling hole 124 and the upper part of the rotational shaft 112 to allow a thrust load to concentrate on the top of the rotational shaft 112 or the thrust member 150 and a radial member 140 is installed on inner surfaces of the rotational shaft 112 and the coupling hole 124 positioned at the lower part of the thrust member 150 to support a radial load.

In addition, an upper race 152 of the thrust member 150 is closely attached or coupled and fixed onto the bottom of the cover part 126 coupled at the upper part of the coupling hole 124 and a rotation hole 154a of a lower race 154 of the thrust member 150 is inserted into a vertical step portion 116b formed on the top of the rotational shaft 112 to slip while maintaining a contact or inserted and thereafter, coupled and fixed and the lower race 154 of the thrust member 150 is seated on a horizontal step portion 116a.

Further, the upper race 152 of the thrust member 150 is closely attached or coupled and fixed onto the bottom of the cover part 126 coupled to the coupling hole 124 and the top of the rotational shaft 112 is rounded to form a round portion 112a and an inner diametral surface of a rotation hole 154a of the lower race 154 of the thrust member 150 is rounded to slip while maintaining the contact by engaging with the round portion 112a.

In addition, the upper race 152 of the thrust member 150 is closely attached or coupled and fixed onto the bottom of the cover part 126 coupled to the upper part of the coupling hole 124 and the rotation hole 154a of the lower race 154 of the thrust member 150 is inserted into a taper portion 118 on the top of the rotational shaft 112 which is tapered up toward a center point to slip while maintaining the contact or inserted and thereafter, coupled and fixed.

Further, the upper race 152 of the thrust member 150 is closed attached or coupled and fixed onto the bottom of the cover part 126 coupled to the upper part of the coupling hole 124 and after a first fixation groove 156 is formed at the center of the bottom of the lower race 154 of the thrust member 150 formed as a disk, the top of the rotational shaft 112 is inserted and coupled into the first fixation groove 156, and as a result, while the top of the rotational shaft 112 is inserted into the first fixation groove 156 to maintain the contact, the top of the rotational shaft 112 slips or inserted and thereafter, coupled and fixed.

In addition, the top of the rotational shaft 112 is tapered or rounded up toward the center point and the first fixation groove 156 has a groove shape corresponding to the shape of the rotational shaft 112.

Further, the upper race 152 of the thrust member 150 is closely attached or coupled and fixed onto the bottom of the cover part 126 coupled to the upper part of the coupling hole 124, a fixation shaft 158 is formed downward at the center of the bottom of the lower race 154 of the thrust member 150 formed as the disk, and a second fixation groove 119 is formed on the top of the rotational shaft 112, and as a result, while a second fixation groove 119 is formed on the top of the rotational shaft 112 and the fixation shaft 158 is inserted into the second fixation groove 119 to maintain the contact, the fixation shaft 158 slips or is inserted and thereafter, coupled and fixed.

In addition, the fixation shaft 158 is tapered or rounded down or the second fixation groove 119 has the groove shape corresponding to the shape of the fixation shaft 158.

Further, the radial member 140 installed in the coupling hole 124 is configured by combining at least one single or multiple types of an opening type, a single-surface shield type, a both-surface shield type, a single-surface sealing type, and a both-surface sealing type.

In addition, the thrust member 150 installed in the coupling hole 124 is configured by combining at least one single or multiple types of a thrust bearing, an angular bearing, an automatic centering bearing, a taper bearing, and an oilless bearing.

Further, the radial member 140 installed in the coupling hole 124 is configured by combining at least one single or multiple bearings of a radial bearing, the automatic centering bearing, the taper bearing, the oilless bearing, at least one pin casters or pin balls, and a needle bearing.

In addition, the roller preferably further includes a shield panel 160 having a shield hole 162 penetrated by the rotational shaft 112 in order to prevent foreign materials or polluted materials from flowing in the coupling hole 124 and coupled to a lower part of the coupling hole 124.

Advantageous Effects

According to the present disclosure, a thrust member securing drivability while supporting a vertical load (thrust load) is installed at a coupling groove or a coupling hole of a transfer bracket and a sealed structure is provided to secure durability of a roller.

In particular, while a radial member transfers biased reaction force generated from a contact of a rolling wheel and a rail to an uppermost part of the rotational shaft, a vertical load concentrates on the center of a lower race of the rotational shaft or a thrust member to minimize a biasing phenomenon of the vertical load and the concentrated vertical load is uniformly distributed at a ball or roller between upper and lower races of the thrust member to smoothly disperse and distribute the vertical load and prevent a lateral thrusting of the rolling wheel, thereby solving the problem of reduced durability of the thrust member and the radial member generated due to a biasing phenomenon of the vertical load.

Further, occurrence of a clearance of the radial member is minimized, a tilting angle of the rotational shaft is minimized, and the lateral thrusting of the rolling wheel is minimized by installing the radial member at a position closest to a tilting occurrence point of the rotational shaft of the rolling wheel, thereby guaranteeing drivability even when a load is applied due to a weight body.

BEST MODE

Hereinafter, a configuration of the present disclosure will be described below with reference to FIGS. 2 to 7 which are accompanied.

Figure 2:
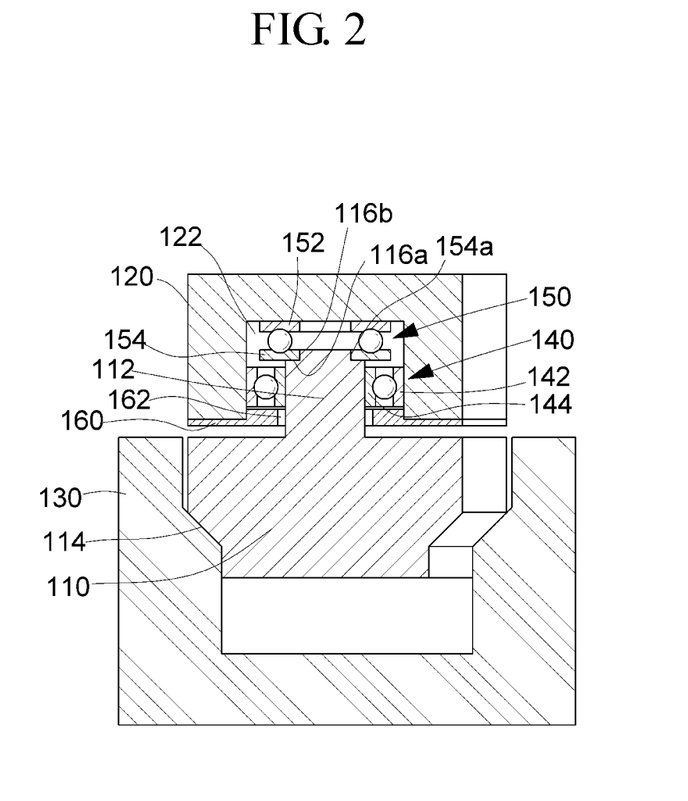
FIG. 2 is a diagram illustrating a roller in which a coupling groove is formed in a transfer bracket according to a first embodiment of the present disclosure.

A rolling wheel 110 according to the present disclosure illustrated in FIG. 2 has an inclined surface 114 having a predetermined slope in a circumferential direction of an outer diametral surface and has a structure in which a rotational shaft 112 is vertically erected as an integrated or separate body at the center of an upper part thereof as illustrated in FIG. 2.

Figure 3:
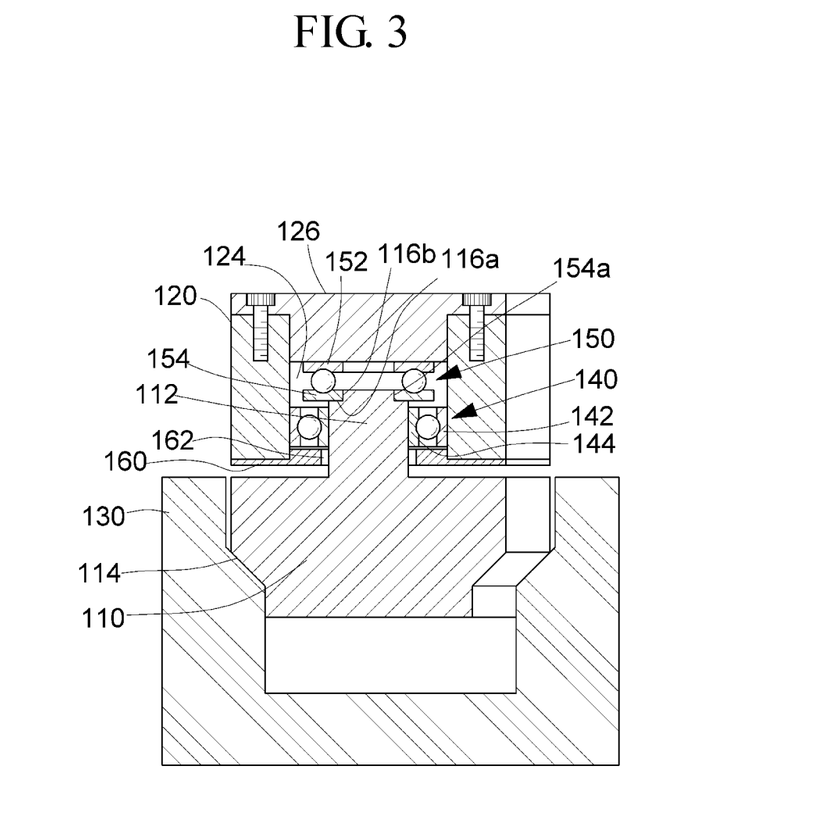
FIG. 3 is a diagram illustrating a structure of the roller in which a coupling hole is formed in the transfer bracket according to the first embodiment of the present disclosure.

In addition, a coupling groove 122 may be formed at a lower part of a transfer bracket 120 to which one or more rolling wheels 110 are rotatably coupled as illustrated in FIG. 2 and a coupling hole 124 penetrating the upper and lower parts of the transfer bracket 120 as illustrated in FIG. 3.

Hereinafter, since a structure in which the coupling hole 124 is formed and a cover part 126 is coupled to the coupling hole 124 is the same as the structure in which the coupling groove 122 is formed in the transfer bracket 120, when an installation structure of a thrust member 150 is described for each embodiment, the installation structure is described based on the coupling groove 122 to substitute for description of the installation structure of the thrust member 150 and the radial member 140 in the transfer bracket 120 having the coupling hole 124 and the cover part 126 as components.

Moreover, in the case of the coupling groove 122 or the coupling hole 124 and the rotational shaft 112, the thrust member 150 is installed at the upper part of the rotational shaft 112 to support a thrust load (vertical load) and the radial member 140 is axially installed in the rotational shaft 112 positioned at the lower part of the thrust member 150 to support a radial load (a load which acts in a diameter direction of the rotational shaft 112).

Herein, the thrust member 150 is a normal structure in which a ball is rotatably coupled between an upper race 152 and a lower race 154 and under a condition in which the ball or roller serving to drive a bearing is installed to rotate in a horizontal direction while receiving the load in an axial direction with a diagonal or vertical contact surface between the upper and lower parts, if other bearings as well as a thrust bearing, an angular bearing, an automatic centering bearing, a taper bearing, an oilless bearing, and the like have a bearing structure which may be used under such a condition, all bearings may be substituted.

In the thrust member 150, the upper race 152 is closely disposed on the bottom of the coupling groove 122 or fixed and coupled onto the bottom of the coupling groove 122 as illustrated in FIG. 2.

Meanwhile, when the coupling hole 124 is formed in the transfer bracket 120, the cover part 126 serves to seal the upper part of the coupling hole 124 while the cover part 126 is coupled to the upper part of the transfer bracket 120 as illustrated in FIGS. 2 and 3 and in this case, the upper race 152 of the thrust member 150 installed in the coupling hole 124 may be closely disposed on the bottom of the cover part 126 or fixed and coupled onto the bottom of the cover part 126.

Herein, in the present disclosure, a means for coupling the upper race 152 of the thrust member 150 to the bottom of the coupling groove 122 or coupling the upper race 152 to the bottom of the cover part 126 is not limited.

That is, a means for coupling the upper race 152 through bolting, welding, riveting, forcible fitting by processing a groove, or the like is not limited in the present disclosure and the upper race 152 may be installed by adopting a coupling method used in the related art as much as you like according to a situation.

In addition, the lower race 154 positioned at the lower part of the upper race 152 of the thrust member 150 is installed at the upper part of the rotational shaft 112 to allow the vertical load transferred from the transfer bracket 120 to concentrate on the rotational shaft 112.

Figure 4:
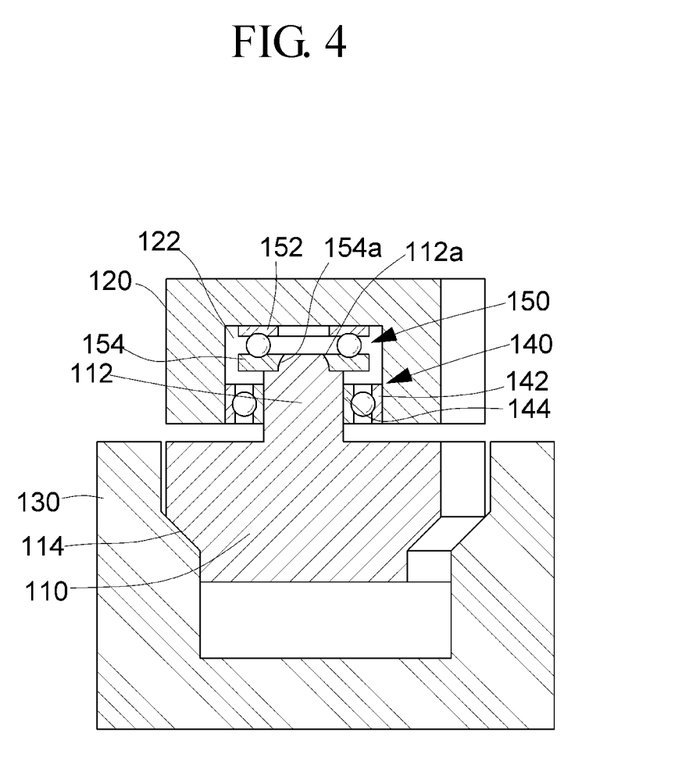
FIG. 4 is a diagram illustrating a structure of a roller according to a second embodiment of the present disclosure.
Figure 5:
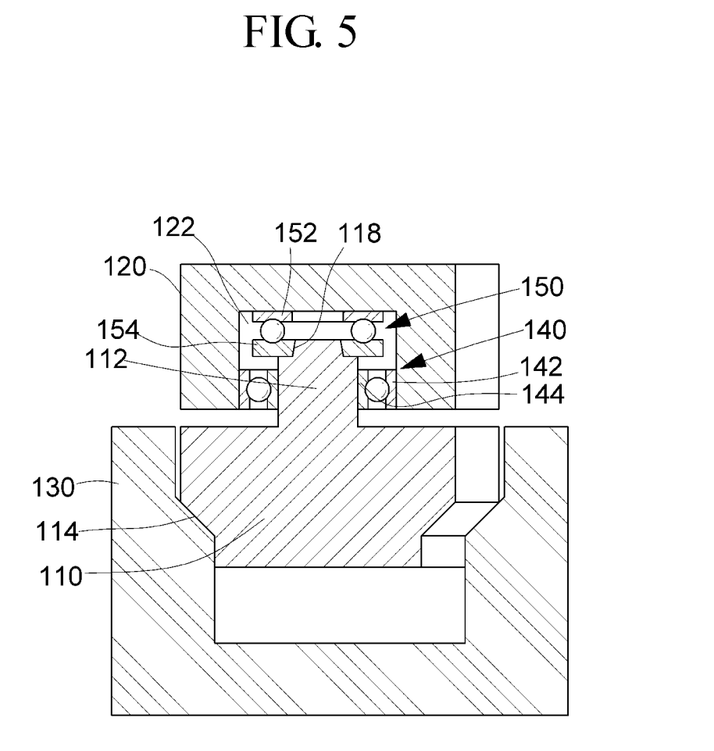
FIG. 5 is a diagram illustrating a structure of a roller according to a third embodiment of the present disclosure.
Figure 6:
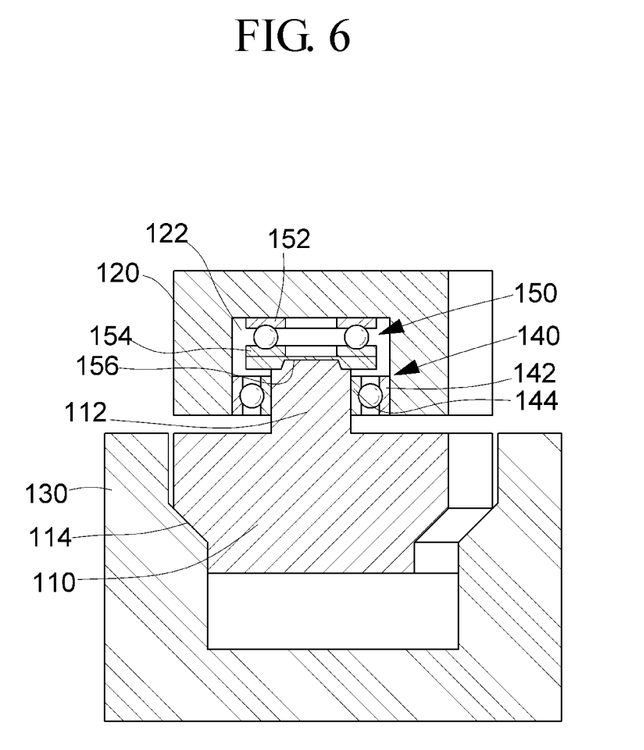
FIG. 6 is a diagram illustrating a structure of a roller according to a fourth embodiment of the present disclosure.
Figure 7:
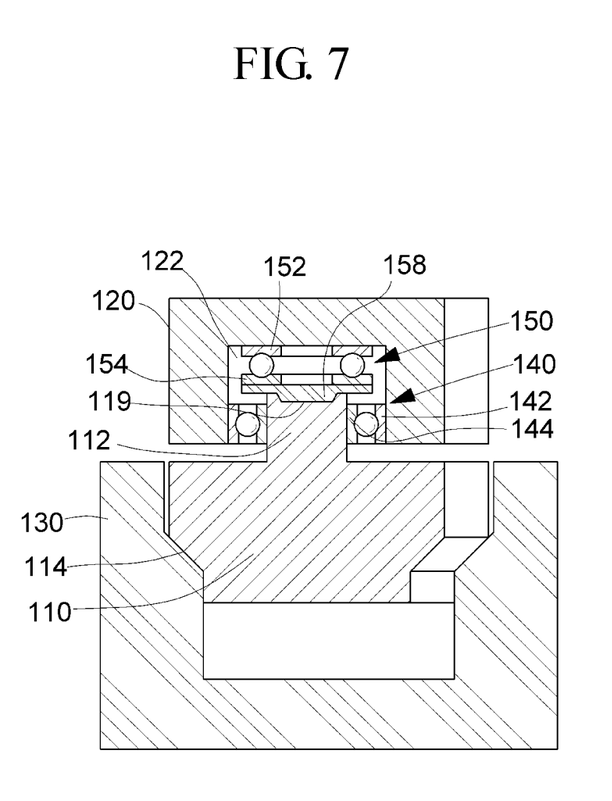
FIG. 7 is a diagram illustrating a structure of a roller according to a fifth embodiment of the present disclosure.

Herein, the present disclosure presents a structure in which the lower race 154 of the thrust member 150 is installed at the upper part of the rotational shaft 112 as multiple embodiments, and as a result, FIGS. 2 and 3 illustrate a first embodiment, FIG. 4 illustrates a second embodiment, FIG. 5 illustrates a third embodiment, FIG. 6 illustrates a fourth embodiment, and FIG. 7 illustrates a fifth embodiment.

Hereinafter, each embodiment in which the lower race 154 of the thrust member 150 is installed on the top of the rotational shaft 112 will be described with reference the accompanying drawings.

In the first embodiment, as illustrated in FIGS. 2 and 3, a horizontal step portion 116a and a vertical step portion 116b are formed on the top of the rotational shaft 112 and a rotation hole 154a of the lower race 154 of the thrust member 150 is inserted into the vertical step portion 116b formed on the top of the rotational shaft 112 to slip while maintaining a contact, and as a result, when the rotational shaft 112 is to be tilted, the rotational shaft 112 and the thrust member 150 slip to each other to minimize an influence of the force to be tilted on the thrust member 150.

On the other hand, the rotation hole 154a of the lower race 154 of the thrust member 150 may be coupled and fixed while being inserted into the vertical step portion 116b formed on the top of the rotational shaft 112.

In the second embodiment, as illustrated in FIG. 4, the top of the rotational shaft 112 is rounded to mold a round portion 112a and an inner diametral surface of the rotation hole 154a of the lower race 154 of the thrust member 150 is rounded so that the round portion 112a slips while maintaining the contact through engagement.

Accordingly, when the force to be tilted acts on the rotational shaft 112 by the reaction generated from the rolling wheel 110 by the radial load or thrust load, the round portion 112a slips at the rotation hole 154a to minimize an influence of the force to tilted to the rotational shaft 112 on the thrust member 150.

In the third embodiment, as illustrated in FIG. 5, the top of the rotational shaft 112 is processed to be tapered up toward a center point to form a tapered portion 118 and while the rotation hole 154a of the lower race 154 of the thrust member 150 is inserted into the tapered portion 118 to maintain the contact, the tapered portion 118 slips at the rotation hole 154a and when the force to be tilted to the rotational shaft 112 thus acts on by the reaction generated from the rolling wheel 110 by the radial load or thrust load, the tapered portion 118 slips at the rotation hole 154a to minimize the influence of the force to be tilted to the rotational shaft 112 on the thrust member 150 as described in the second embodiment.

Moreover, the lower race 154 of the thrust member 150 is axially installed at the tapered portion 118 as described above to fix and couple the lower race 154 to the rotational shaft 112.

Accordingly, when the force to be tilted to the rotational shaft 112 is applied by the reaction generated from the rolling wheel 110 by the radial load or thrust load, the tapered portion 118 formed as such has a predetermined slope and the small force to tilt the rotational shaft 112 is thus applied to the lower race 154 of the thrust member 150, and as a result, generation of the biased load may be minimized.

In the fourth embodiment, as illustrated in FIG. 6, after a first fixation groove 156 is formed at the center of the bottom of the lower race 154 of the thrust member 150 formed as a disk, the top of the rotational shaft 112 is inserted and coupled into the first fixation groove 156, and as a result, while the top of the rotational shaft 112 is inserted into the first fixation groove 156 to maintain the contact, the top of the rotational shaft 112 slips.

The rotational shaft 112 is tapered or rounded up toward the center point of the top and the first fixation groove 156 has a groove shape corresponding to the shape of the rotational shaft 112, and as a result, the top of the rotational shaft 112 is inserted and coupled into the first fixation groove 156.

Even in the fourth embodiment, when the force to be tilted to the rotational shaft 112 is applied by the reaction generated from the rolling wheel 110 as the top of the rotational shaft 112 is tapered or rounded as described in the second embodiment, a slip phenomenon minutely occurs when the force is applied onto of the top of the rotational shaft 112 which is tapered or rounded as described above, and as a result, even though the rotational shaft 112 is minutely tilted, the force is transferred to the lower race 154 of the thrust member 150 while the force is reduced or cancelled to minimize the generation of the biased load.

In the fifth embodiment, as illustrated in FIG. 7, a fixation shaft 158 is formed downward from the center of the bottom of the lower race 154 of the thrust member 150 formed as the disk and a second fixation groove 119 is formed on the top of the rotational shaft 112, and as a result, the fixation shaft 158 is inserted into the second fixation groove 119 and the fixation shaft 158 may thus slip while the fixation shaft 158 is inserted into the second fixation groove 119 to maintain the contact and the fixation shaft 158 is tapered or rounded downward and the second fixation groove 119 has the groove shape corresponding to the shape of the fixation shaft 158 to insert and fix the fixation shaft 158 into the second fixation groove 119.

Even in the fifth embodiment, when the force to be tilted to the rotational shaft 112 is applied by the reaction generated from the rolling wheel 110 as the second fixation groove 119 tapered or rounded on the top of the rotational shaft 112 and the fixation shaft 158 formed on the lower race 154 of the thrust member 150 are tapered or rounded as described in the fourth embodiment, the slip phenomenon minutely occurs in the fixation shaft 158 and the second fixation groove 119 which is tapered or rounded as described above, and as a result, even though the rotational shaft 112 is minutely tilted, the force is transferred to the lower race 154 of the thrust member 150 while the force is reduced or cancelled to minimize the generation of the biased load.

Meanwhile, the radial member 140 is coupled to the lower part of the coupling groove 122 of the transfer bracket 120 or the lower part of the coupling hole 124 and the lower part of the rotational shaft 112 and the radial member 140 may be positioned at the lower part of the thrust member 150.

The radial member 140 is a normal radial member in which the ball is rotatably coupled between an outer ring 142 and an inner ring 144 and under a condition in which a left side and a right side of the radial member 140 are installed to contact in an orthogonal direction or a diagonal direction to the shaft, since all other bearing structures which may be used under such a condition may be selectively adopted and installed as well as the radial bearing, the automatic centering bearing, the taper bearing, the oilless bearing, at least one pin casters or pin balls or needle bearing, the present disclosure is not limited thereto.

In the radial member 140, the outer ring 142 is fixed and coupled onto the inner surface of the coupling groove 122 or the coupling hole 124 as illustrated in FIGS. 3 to 6, and as a result, in the present disclosure, a means for coupling the outer ring 142 to the inner surface of the coupling groove 122 or the coupling hole 124 is not limited.

That is, a means for coupling the outer ring 142 through bolting, welding, riveting, forcible fitting by processing a groove, inserting and installing multiple cylinders, fitting and coupling the outer ring 142 between the cylinders, or the like is not limited in the present disclosure and the outer ring 142 may be installed by adopting a coupling method used in the related art as much as you like according to a situation.

In addition, the inner ring 144 positioned inside the outer ring 142 is axially installed at the lower part of the rotational shaft 112, and as a result, when the rotational shaft 112 rotates, the inner ring 144 also rotates.

Herein, the radial member 140 installed in the coupling groove 122 or the coupling hole 124 is configured by combining at least one single or multiple types of an opening type, a single-surface shield type, a both-surface shield type, a single-surface sealing type, and a both-surface sealing type.

Accordingly, when the radial member 140 configured as the shield type or the sealing type is installed, the lower part of the coupling groove 122 or the coupling hole 124 is sealed to fundamentally prevent inflow of foreign materials or polluted materials in the coupling groove 122 or the coupling hole 124.

Further, as illustrated in FIGS. 2 and 3, in order to prevent the foreign materials or polluted materials from flowing in the coupling groove 122 or the coupling hole 124, a shield panel 160 in which a shield hole 162 penetrated by the rotational shaft 112 is formed is coupled to the lower part of the coupling groove 122 or the coupling hole 124 to prevent the inflow of the foreign materials or the polluted materials and a structure may be adopted, in which the shield panel 160 is coupled to the lower part of the coupling groove 122 or the coupling hole 124 while adopting the radial member 140 as the shield type or the sealing type.

An operation state of the roller according to the present disclosure, which has such a configuration, will be described below with reference to FIG. 3.

First, when the inclined surface of the rolling wheel 110 rolling-contacts the guide rail 130 as illustrated in FIGS. 2 to 7, a load of an object or equipment installed at the upper part of the transfer bracket 120 is transferred to the guide rail 130 through the transfer bracket 120 and the rotational shaft 112.

In this case, force which reacts to the load of the object or equipment at the upper part of the transfer bracket 120 is generated in the guide rail according to the action and reaction law (when object A applies the force to object B (action), object B also applies force having the same magnitude to object B (reaction)), and as a result, repulsive power acts in an opposite side to the guide rail 130 at a rolling-contact position.

As a result, since the force of the reaction generated as such acts in an upper right direction of the rolling wheel 110 in FIG. 2, the reaction force acts as force to tilt the rolling wheel 110 on the guide rail 130.

In the related art, the force by the reaction is solved by the radial bearing 40 on the top of the rotational shaft 112 as illustrated in FIG. 1B, but since a rotational angle for the force to be tilted increases as being distant from a point where the reaction is generated as illustrated in FIG. 1B, occurrence of a clearance depending on the assembly tolerance generated in a coupling structure with the radial bearing 40 and the rotational shaft 12 and a permission tolerance of the radial bearing 40 itself may not be prevented according to the force generated as the reaction in the related structure in which the radial bearing 40 is axially installed on the top of the rotational shaft 112 and further, since the rotational angle at the upper part of the rotational shaft 112 has a larger rotational angle to tilt the rotational shaft 112 than the lower part of the rotational shaft 112, the size of the clearance increases as large as the rotational angle, and as a result, the vertical load cannot but be biased to any one side by a minute tilting phenomenon of the rotational shaft 112.

However, the radial member 140 according to the present disclosure is axially installed on the bottom of the rotational shaft 112, and as a result, the radial member 140 is installed at a closer position to the point where the reaction occurs. Therefore, the rotational angle for the force to be tilted by the reaction decreases as large, and as a result, when the radial load depending on the force generated as the reaction is absorbed and dispersed, the radial load is absorbed and dispersed more easily than the case where the radial member 140 is installed on the top of the rotational shaft 112.

Consequently, in respect to the load for a total weight of the object or equipment installed at the upper part of the transfer bracket 120, if the radial member 140 eccentrically rotates when a load corresponding to a size of 10 acts in the related art, when the load for the total weight of the object or equipment installed at the upper part of the transfer bracket 120 has the size of 10, rotation without eccentricity is achieved while the radial load by the load is more easily absorbed and dispersed.

Meanwhile, in the present disclosure, the thrust member 150 is installed on the top of the rotational shaft 112 as illustrated in FIGS. 2 to 7.

Since the lower race 54 of the thrust bearing 50 is directly installed at the upper part of the inclined surface rolling wheel 10 as illustrated in FIG. 1B in the related art, when the inclined surface rolling wheel 10 is thrust to a lateral surface, since the force is biased to the left side of the thrust bearing 50 while a gap between the inclined surface rolling wheel 10 and the transfer bracket 20 at the left side is smaller than the gap between the inclined surface rolling wheel 10 and the transfer bracket 20 at the right side as illustrated in FIG. 1B, an oil film is broken, and the like.

However, in the present disclosure, even when the lateral thrusting of the rolling wheel 110 occurs, since the thrust member 150 is positioned at the upper part of the radial member 140, the radial load by the lateral thrusting is absorbed and dispersed by the radial member 140 to minimize an influence on lateral thrusting.

Moreover, the thrust load concentrates on the tops of the lower race 154 of the thrust member 150 and the rotational shaft 112 and in this case, since the lower race 154 of the thrust member 150 is axially installed on the rotational shaft 112 or is installed to slip, an influence by the lateral thrusting or tilting phenomenon of the rotational shaft 112 may be minimized.

In addition, in the roller in the related art, since the lower race 54 is wholly influenced even in the lateral thrusting within a tolerance range provided with respect to the force with which the thrust member 50 is thrust in the horizontal direction, the lower race 54 presses the ball as illustrated in FIG. 1C, but in the present disclosure, since the lower race 154 does not wholly have a fixed structure and the thrust load concentrates on the tops of the lower race 154 and the rotational shaft 112, the lower race 154 may secure rollability by flexibly coping with the lateral thrusting within the tolerance provided with the respect to the force with which the thrust member 150 is thrust in the horizontal direction.

Furthermore, since the radial load is absorbed and dispersed with smaller force than the related art on the bottom of the rotational shaft 112, the force to tilt the rotational shaft 112 also decreases and the rotational angle to tilt the rotational shaft 112 also decreases to prevent an overload from being generated in the thrust member 150 and since the vertical load acts not to be biased to any one side but wholly uniformly acts on the thrust member 150, the problems including the breakage of the oil film of the thrust member 150 by the biased load, and the like may be solved.

Consequently, since the radial load is absorbed and dispersed by the radial member 140 and the thrust member 150 is positioned out of an influence area of the lateral thrusting, eccentric rotation or partial abrasion by the lateral thrusting of the rolling wheel 110 like the thrust member 150 in the related art may be completely resolved.

Moreover, in the related art, since the thrust bearing 50 is positioned at the lower part of the radial bearing 40, if the force to tilt the inclined surface rolling wheel 10 is directly influenced by the thrust bearing 50 due to the reaction by the vertical load while the radial bearing 40 may not absorb and disperse the radial load, in the present disclosure, since the thrust member 150 is installed on the top of the rotational shaft 112 at a position spaced apart to the upper part from the rolling wheel 110, the problem in that the thrust member 150 is eccentric or partially abraded may be completely resolved.

The invention claimed is:

1. A roller wherein a rotational shaft at an upper part of a rolling wheel having a slanted surface formed on a circumference of an outer diametral surface is inserted into one or more coupling grooves formed in a transfer bracket and a thrust member is installed at the upper part of the rotational shaft to allow a thrust load to concentrate at the top of the rotational shaft or the thrust member and a radial member is installed on the rotational shaft and inner surfaces of the coupling groove positioned at the lower part of the thrust member to support a radial load.

2. The roller of claim 1, wherein an upper race of the thrust member is closely attached or coupled onto the bottom of the coupling groove and a rotation hole of a lower race of the thrust member is inserted into a vertical step portion formed on the top of the rotational shaft to slip while maintaining a contact or inserted and thereafter, coupled and fixed and the lower race of the thrust member is seated on a horizontal step portion.

3. The roller of claim 1, wherein the upper race of the thrust member is closely attached or coupled onto the bottom of the coupling groove and the top of the rotational shaft is rounded to form a round portion and an inner diametral surface of a rotation hole of the lower race of the thrust member is rounded to slip while maintaining the contact by engaging with the round portion.

4. The roller of claim 1, wherein the upper race of the thrust member is closely attached or coupled onto the bottom of the coupling groove and the rotation hole of the lower race of the thrust member is inserted into a taper portion on the top of the rotational shaft which is tapered up toward a center point to slip while maintaining the contact or inserted and thereafter, coupled and fixed.

5. The roller of claim 1, wherein the upper race of the thrust member is closely attached or coupled onto the bottom of the coupling groove, wherein a first fixation groove is formed at the center of the bottom of the lower race of the thrust member formed as a disk, and wherein the top of the rotational shaft is inserted and coupled into the first fixation groove and then slips while maintaining contact, or the top of the rotational shaft is inserted and then coupled and fixed.

6. The roller of claim 5, wherein the top of the rotational shaft is tapered or rounded up toward the center and the first fixation groove has a groove shape corresponding to the shape of the rotational shaft.

7. The roller of claim 1, wherein the upper race of the thrust member is closely attached or coupled onto the bottom of the coupling groove, a fixation shaft is formed downward at the center of the bottom of the lower race of the thrust member formed as the disk, and a second fixation groove is formed on the top of the rotational shaft, and as a result, while a second fixation groove is formed on the top of the rotational shaft and the fixation shaft is inserted into the second fixation groove to maintain the contact, the fixation shaft slips or is inserted and thereafter, coupled.

8. The roller of claim 7, wherein the fixation shaft is tapered or rounded down or the second fixation groove has the groove shape corresponding to the shape of the fixation shaft.

9. The roller of claim 1, wherein the radial member installed in the coupling groove is configured by combining at least one or more types of an opening type, a single-surface shield type, a both-surface shield type, a single-surface sealing type, and a both-surface sealing type.

10. The roller of claim 1, wherein the thrust member installed in the coupling groove is configured by combining at least one bearing of a thrust bearing, an angular bearing, an automatic centering bearing, a taper bearing, and an oilless bearing.

11. The roller of claim 1, wherein the radial member installed in the coupling groove is configured by combining at least one bearing of a radial bearing, an automatic centering bearing, a taper bearing, an oilless bearing, at least one pin caster or pin ball, and a needle bearing.

12. The roller of claim 1, further comprising:
a shield panel having a shield hole penetrated by the rotational shaft in order to prevent foreign materials or polluted materials from flowing in the coupling groove and coupled to a lower part of the coupling groove.

13. A roller wherein a rotational shaft at an upper part of a rolling wheel having a slanted surface formed on a circumference of an outer diametral surface is inserted into one or more coupling holes formed to penetrate vertically in a transfer bracket and a thrust member is installed between the bottom of a cover part coupled to an upper part of the coupling hole and the upper part of the rotational shaft to allow a thrust load to concentrate on the top of the rotational shaft or the thrust member and a radial member is installed on inner surfaces of the rotational shaft and the coupling hole positioned at the lower part of the thrust member to support a radial load.

14. The roller of claim 13, wherein an upper race of the thrust member is closely attached or coupled onto the bottom of the cover part coupled at the upper part of the coupling hole and a rotation hole of a lower race of the thrust member is inserted into a vertical step portion formed on the top of the rotational shaft to slip while maintaining a contact or inserted and thereafter, coupled and fixed and the lower race of the thrust member is seated on a horizontal step portion.

15. The roller of claim 13, wherein the upper race of the thrust member is closely attached or coupled onto the bottom of the cover part coupled to the coupling hole and the top of the rotational shaft is rounded to form a round portion and an inner diametral surface of a rotation hole of the lower race of the thrust member is rounded to slip while maintaining the contact by engaging with the round portion.

16. The roller of claim 13, wherein the upper race of the thrust member is closely attached or coupled onto the bottom of the cover part coupled to the upper part of the coupling hole and the rotation hole of the lower race of the thrust member is inserted into a taper portion on the top of the rotational shaft which is tapered up toward a center point to slip while maintaining the contact or inserted and thereafter, coupled.

17. The roller of claim 13, wherein the upper race of the thrust member is closed attached or coupled onto the bottom of the cover part coupled to the upper part of the coupling hole, wherein a first fixation groove is formed at the center of the bottom of the lower race of the thrust member formed as a disk, and wherein the top of the rotational shaft is inserted and coupled into the first fixation groove and then slips while maintaining contact, or the top of the rotational shaft is inserted and then coupled and fixed.

18. The roller of claim 17, wherein the top of the rotational shaft is tapered or rounded up toward the center and the first fixation groove has a groove shape corresponding to the shape of the rotational shaft.

19. The roller of claim 13, wherein the upper race of the thrust member is closely attached or coupled onto the bottom of the cover part coupled to the upper part of the coupling hole, wherein a fixation shaft is formed downward at the center of the bottom of the lower race of the thrust member formed as the disk, and wherein a second fixation groove is formed on the top of the rotational shaft and then slips while the fixation shaft is inserted into the second fixation groove to maintain the contact, or the fixation shaft is inserted and then coupled and fixed.

20. The roller of claim 19, wherein the fixation shaft is tapered or rounded down or the second fixation groove has the groove shape corresponding to the shape of the fixation shaft.

21. The roller of claim 13, wherein the radial member installed in the coupling hole is configured by combining at least one type of an opening type, a single-surface shield type, a both-surface shield type, a single-surface sealing type, and a both-surface sealing type.

22. The roller of claim 13, wherein the thrust member installed in the coupling hole is configured by combining at least one type of a thrust bearing, an angular bearing, an automatic centering bearing, a taper bearing, and an oilless bearing.

23. The roller of claim 13, wherein the radial member installed in the coupling hole is configured by combining at least one bearing of a radial bearing, an automatic centering bearing, a taper bearing, an oilless bearing, at least one pin caster or pin ball, and a needle bearing.

24. The roller of claim 13, further comprising:
a shield panel having a shield hole penetrated by the rotational shaft in order to prevent foreign materials or polluted materials from flowing in the coupling hole and coupled to a lower part of the coupling hole.

* * * * *